(12) United States Patent
Edmondson

(10) Patent No.: US 7,183,346 B2
(45) Date of Patent: Feb. 27, 2007

(54) CATHODIC CORROSION PROTECTION POWDER COATING COMPOSITION AND METHOD

(75) Inventor: Stephen J. Edmondson, Houston, TX (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/546,487

(22) PCT Filed: Apr. 28, 2004

(86) PCT No.: PCT/US2004/013698

§ 371 (c)(1), (2), (4) Date: Aug. 22, 2005

(87) PCT Pub. No.: WO2004/096926

PCT Pub. Date: Nov. 11, 2004

(65) Prior Publication Data

US 2006/0167155 A1    Jul. 27, 2006

(51) Int. Cl.
*C08K 3/10* (2006.01)
*C08K 3/38* (2006.01)

(52) U.S. Cl. .................................. 524/405; 523/445
(58) Field of Classification Search ............... None
See application file for complete search history.

(56) References Cited

U.S. PATENT DOCUMENTS 4,351,914 A * 9/1982 Khanna ................. 523/448

FOREIGN PATENT DOCUMENTS

EP    0588318 B1 *  3/1994

* cited by examiner

Primary Examiner—Bruce F. Bell

(57) ABSTRACT

The present invention provides a curable cathodic corrosion protection powder coating, which comprises a thermosetting resin, a zinc borate compound, a curing agent in an amount effective to cure the coating. Further, the present invention also provides a method of cathode corrosion protection which includes the steps of subjecting the substrate to a mechanical treatment, applying to said treated steel surface, the cathodic protective coating, and polarizing the coated material as a cathode.

2 Claims, 1 Drawing Sheet

CATHODIC CORROSION PROTECTION POWDER COATING COMPOSITION AND METHOD

BACKGROUND OF THE INVENTION

1. Field of the Invention

The present invention is directed to a cathodic corrosion protection composition and method. In particular, this invention is directed to a curable powder coating composition comprising zinc borate and a method for applying the coating composition, which when applied onto a steel, or other ferrous substrate, provides an anticorrosive coating, effective for improving resistance to cathodic disbondment.

2. Description of the Related Art

One means for preventing corrosion of steel materials, in humid conditions containing electrolytes such as brine and salt solution is cathodic protection. Cathodic protection prevents dissolution of steel by maintaining a steel material as a cathode and inhibiting ionization of iron. However, when the iron portion has a large area, consumption of power and a sacrificial anode increases. Therefore, the steel material is not generally used directly for a cathodic protection, but in most cases, a cathodic protection is effected in combination with an organic coating and/or lining. Through this approach, major proportions of the steel material are protected from corrosion by the organic coating, and defective portions occurring in this organic coating such as scratches and pin-holes, can be supplemented by cathodic protection.

In cathodic protection, metal ions are reduced and become insoluble on the metal surface polarized to the cathode. Therefore, a satisfactory effect can be obtained by effecting anticorrosion by applying power in correspondence with the metal ions which are to be dissolved. The amount of the metal ions to be dissolved is proportional to the surface area of the metal, and corresponds to the surface area of the defective portions in the case of the coated steel material. However, it is extremely difficult to know the exact surface area of the defective portions. For this reason, a cathodic protection is generally applied in excess. However, excessive polarization generates hydroxyl ions due to hydrolysis of water at the cathode, so that scratched portions of the organic coating function as a cathode and are always exposed to an alkaline atmosphere. When such a condition occurs, degradation of the organic coating's adhesion points occurs on any of the interfaces between the steel material and the organic coating and between the organic coatings, particularly at the portions at which alkali resistance is weak, and cathodic disbanding of the organic coating occurs.

As a means for restricting such cathodic disbonding, a method of carrying out a chromate treatment or applying a zinc-rich primer coating of a specific thermosetting epoxide resin has been proposed (see Japanese Unexamined Patent Publication (Kokai) No. 59-222275). However, this technique is not sufficient to satisfy the high-level requirement for the cathodic disbonding resistance in recent years, and does not employ a zinc borate based pigment component in the composition. Japanese Unexamined Patent Publication (Kokai) No. 55-142063 discloses a composition consisting of a polyvinyl butyral resin, a liquid epoxide resin, a borate compound, an epoxy-silane coupling agent and phosphoric acid as a pre-treatment composition for baking type. However, this coating composition is directed to a wash primer for pre-treating a metal and is different from the object of the present invention, and the resins used in this reference do not use a curing agent and are thermoplastic resins.

Methods of restricting such cathodic disbanding are generally known. Unfortunately, many of these techniques are not sufficient to satisfy the high-level requirement for the cathodic disbonding resistance in recent years. A method of providing cathodic protection from corrosion by carrying out the steps of steel pre-treatment, applying a zinc-rich thermosetting epoxide resin based powder coating, and subsequently polarizing the coated steel material as cathode, has been described in European Patent EP 0 588 318 B1, Kaga. However, this technique is limited to coatings with relatively high levels (5–75 wt. %) of zinc compounds, which presents issues of solubility over long periods of time, as well as the increased cost for the zinc borate compound.

Therefore, there is a need for coating compositions, preferably powder coating composition, and methods of application thereof, which provide optimum long term and high temperature and humidity cathodic disbondment protection, at a lower cost.

SUMMARY OF THE INVENTION

The present invention provides a curable cathodic corrosion protection coating, preferably a powder coating, in which the coating comprises:

(a) a thermosetting resin, or mixture of thermosetting resins;

(b) from about 0.5 to 4.75% by weight, based upon total solids weight, of a zinc borate compound; and (c) a curing agent(s) in an amount effective to cure the coating.

The present invention further provides a method of cathodic corrosion protection which includes the steps of subjecting the substrate to a mechanical treatment, applying to said treated steel surface the cathodic protective coating, and polarizing the coated material as a cathode.

DETAILED DESCRIPTION OF THE INVENTION

Figure 1:
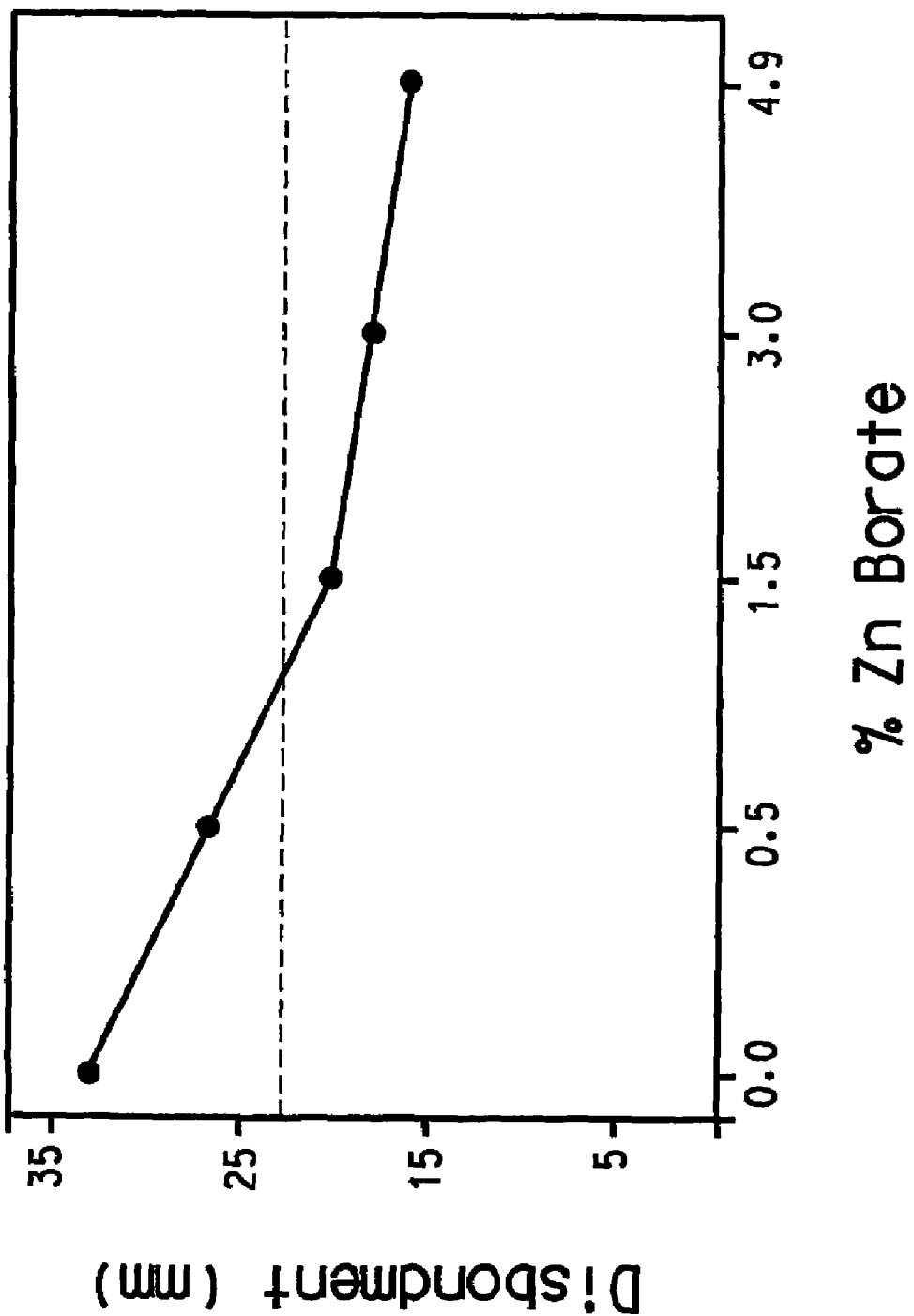
FIG. 1 is a graph illustrating the cathodic disbondment resistance correlation with zinc borate concentration.

To improve coating resistance to cathodic disbanding, the historical approach is to improve the ability to adhere to the steel by adding polar groups, as described in U.S. Pat. No. 4,330,644 issued to Allen. Another approach is to add high levels of zinc borate to minimize corrosion as described in Euro. Pat. No. 0 588 318 B1 issued to Kaga, which was previously mentioned.

The present invention is based upon the discovery that incorporation of low levels (additive quantities) of a zinc borate compound into a thermosetting resin based coating system, preferably a powder coating system, and applying this finish to a steel substrate, provides a coating which has excellent resistance to cathodic disbanding, especially in long term high temperature and humidity conditions. The coating, and method of use thereof, of the present invention is useful as a coating for steel substrates, including for example, but not limited to, the internal and external surfaces of steel pipes, structural steel used in concrete, storage tanks, structural steel in marine environments, and oil production tubing and casings.

In the coating composition of the present invention, any thermosetting resin can be used so long as it can firmly adhere to a steel material or to a steel material subjected to a mechanical treatment such as blast cleaning or to a steel material subjected to a chemical treatment such as a chromate treatment or treatment with zinc phosphate. Examples of such resins include an epoxy resin with an epoxy resin curing agent, a polyol resin with isocyanates, an acryl modified epoxy resin with a polymerization initiator, an alkyd resin, a humidity curing urethane resin, and so forth. Preferably the thermosetting resin is an epoxy resin. More preferably the thermosetting resin is an epoxy resin, or mixtures of epoxy resins, used in conjunction with an effective epoxy curing agent.

The coating composition of the present invention preferably contains about 25 to 90% by weight, based upon total solids weight, of a thermosetting resin, or any mixture of thermosetting resins. More preferably, the composition contains about 60 to 80% by weight, based upon total solids weight, thermosetting resin, or mixtures thereof.

Examples of epoxy thermosetting resins suitable for the present invention are di-glycidyl ethers of 4,4-(bishydroxyphenyl) alkanes prepared by reacting 4,4'-(bishydroxyphenyl) alkanes such as bisphenol A, bisphenol F, bisphenol AD, etc., with epihalohydrin. There is no problem in using glycyldyl ethers of 4,4-(bishydroxyphenyl) alkanes as the principal component in combination with a phenol novolac epoxy resin or cresol novolac epoxy resin, or other multi-functional resins. Epoxy resins of this kind are commercially available on the market as "EPON" and "EPIKOTE" (both are products of Resolution Performance Products, LLC.), "EPO-TOHTO" (a product of Tohto Kasei K.K.), "ARALDITE" (a product of Vantico), "EPICLON" (a product of Dainippon Ink & Chemicals, Inc.), "Dow Epoxy" (a product of Dow Chemical International, Ltd.), and so forth. A particularly useful epoxy is "EPON" 2024 bisphenol A/epichlorohydrin thermosetting epoxy resin, available from Resolution Performance Products, LLC.

The coating composition of the present invention also contains a curing agent, or mixture of curing agents, incorporated in an amount effective to cure the coating. Preferably the coating contains about 1 to 35% by weight, based upon total solids weight, of a curing agent, or any mixture of curing agents. More preferably, the composition contains about 2 to 20% by weight, based upon total solids weight of a curing agent, or mixtures thereof.

Conventional curing agents for epoxy resins containing a plurality of addition-polymerizable functional groups to the epoxy group of an epoxy resin in the molecules thereof can be used as the epoxy curing agent. Examples of the epoxy curing agents of this kind include diamines such as aliphatic diamines, aromatic diamine and heterocyclic diamines, various modified products of these diamines, polyamide resins obtained by the reaction with aliphatic acids and their dimers, acid anhydrides, thiols, phenols, and so forth. These curing agents are commercially available on the market as "EPOMATE" (a product of Resolution Performance Products, LLC.; various heterocyclic diamine modified products), "SUMMIDE" (a product of Sanwa Chemical Industry Co., Ltd.; various amine adducts or polyamides), "TOHMIDE" (a product of Fuji Kasei-Kogyo K.K.; various polyamides), "EPIKURE" (a product line of Resolution Performance Products, LLC.; various amine adducts, thiols, phenols), "RIKASHIDE" (a product of New Japan Chemical Co., Ltd.; acid anhydrides), and so forth. Instead of being the addition polymerization type, the curing agents may be accelerated dicyandiamides having addition reactivity and self-polyaddition catalytic activity between epoxy groups, the derivatives thereof, and imidazoles. These epoxy resin curing agents are appropriately selected and used in accordance with the types of the coating, the curing conditions (ordinary temperature curing, heat curing, etc.), and so forth. A particularly useful epoxy curing agent is "EPIKURE" P104, an accelerated dicyandiamide, available from Resolution Performance Products, LLC.

In cases where the thermosetting curing system comprises a polyol resin and an isocyanate curing agent, urethane bonds, also known as carbamate bonds, are formed by reacting the hydroxyl groups of the polyol resin with the isocyanate groups. Examples of the polyol resin are polyol resins obtained by conventional preparation methods, such as polyester polyols, acrylic polyols, polyether polyols, etc., and these polyol resins are used either alone or in mixture of two or more polyols. The curing components of these polyol resins are commercially available on the market as polyol diisocyanate adducts prepared by adding an equimolar diisocyanate to the number of hydroxyl groups of polyhydric alcohol compound and diisocyanate polymers obtained through self-polyaddition by reacting water with diisocyanates.

When the thermosetting resin comprises an acryl modified epoxy resin, such resin is formed by introducing a polymerizable double bond into the epoxy group of the epoxy resin by the addition reaction of acrylic acid, and the epoxy resins having various grades are commercially available. These acryl modified epoxy resins can be polymerized by radical polymerization, and can be cured by the use of a catalyst such as an organic peroxide, a photo-polymerization initiator, etc., as the polymerization initiator.

In the present invention, if an alkyd resin based thermosetting system is used, the alkyd resin can be obtained by dehydration polycondensation or addition polymerization of polyhydric alcohols, polyvalent carboxylic acid or their anhydrides by aliphatic acids. Examples of the polyhydric alcohols as the starting material of the alkyd resin includes dihydric alcohols such as ethylene glycol, propylene glycol, 1,3-butylene glycol, 1,6-hexane diol, diethylene glycol, dipropylene glycol, neopentyl glycol, triethylene glycol, hydrogenated bis-phenol A, bis-phenol dihydroxypropyl ether, etc.; trihydric alcohols such as glycerin, trimethylolpropane, tris-hydroxymethyl aminomethane, etc.; and tetrahydric alcohols such as pentaerythrit, dipentaerythrit, etc. Examples of polyvalent carboxylic acids include dibasic acids such as phthalic anhydride, isophthalic acid, terephthalic acid, succinic anhydride, adipic acid, azelaic acid, sebacic acid, tetrahydrophthalic anhydride, hexahydrophthalic anhydride, tetrabromophthalic anhydride, tetrachlorophthalic anhydride, endomethylene tetrahydrophthalic anhydride, maleic anhydride, fumaric anhydride, itaconic acid, etc.; tribasic acids such as trimellitic anhydride, methylcyclohexenetricarboxylic acid, etc.; and tetrabasic acids such as pyromellitic anhydride. Examples of the aliphatic acids are caprylic acid, capric acid, lauric acid, myristic acid, palmitic acid, stearic acid, oleic acid, ricinoleic acid, linolenic acid, eleostearic acid, and so forth.

In some cases, the alkyd resins synthesized from the polyhydric alcohols, the polybasic acids and the aliphatic acids described above are used, but in many cases, they are used after being subjected to various modification treatments. Examples of the modified resins include phenol-alkyd resins obtained by adding phenols to the alkyd resin and having improved chemical resistance and adhesion to the steel material, bisphenol type epoxy resins, epoxy-modified alkyd resins obtained by adding alicyclic or aliphatic epoxy compounds (the resin of this type are sometimes referred to as the "epoxypolyester resins") and vinylalkyd resins obtained by adding styrene, vinyltoluene, acrylic acid esters or methacrylic acid esters. Curing of these various kinds of alkyd resins can be made by a melamine resin or a urea resin. They can be cured by oxidation in air using organometallic salts such as an organic acid with lead, manganese, cobalt, etc. In the present invention, these alkyd resins can be selected optionally in order to satisfy performance other than the cathodic disbonding resistance, and the applicability of coating.

The term "humidity curing urethane resin" means those resins which are prepared by synthesizing a resin having an isocyanate group left at the terminal thereof by reacting an isocyanate in excess with a polyol resin and a polyhydric alcohol and reacting and curing the isocyanate groups between the resins by the moisture in air. Examples of the polyol resins used here include a polyether polyol resin, a polyester polyol resin, an acrylic polyol resin, etc., and examples of the isocyanate compounds include aromatic isocyanates such as toluene isocyanate, 4,4'-diphenyl isocyanate, xylylene diisocyanate, isophorone diisocyanate, etc.; hexamethylene diisocyanate, saudine diisocyanate, various isocyanates obtained by hydrogenating the aromatic isocyanates described above, and aliphatic isocyanates such as trimethylhexamethylene diisocyanate and dimer acid diisocyanates. In the present invention, the humidity curing urethane resin synthesized by arbitrarily selecting the polyol resin and various isocyanate compounds described above is used.

Further, the present invention may use a phenoxy resin. The phenoxy resin is an epoxy resin which is derived from bisphenol and has an extremely large molecular weight. The number average molecular weight thereof is at least 10,000 and the number of epoxy groups is extremely small. Examples of commercially available phenoxy resins are "DER684" (a product of Dow Chemical), "EPOTOHTO YD050" and "EPOTOHTO YD040" (products of Tohoto Kasei K.K.).

The ratio of the curing agent/reactive resin component of the coating solution is preferably (0.6–1.1)/1.0, more preferably (0.8–1.0)/1.0, in terms of the equivalent ratio of the reactive group of the curing agent and the functional groups capable of reacting with the reactive group of the curing agent.

The coating composition of the present invention further comprises a zinc borate compound. The zinc borate compound promotes disbondment resistance by reducing conversion of the steel substrate. The effect is most noticeable in long term severe exposure tests, such as 28 day cathodic disbondment tests at elevated temperatures (e.g. 80° C.), where the zinc borate compound can reduce disbanding by 50%. The zinc borate compound is added at low levels below 5% by weight, based on total solids, preferably from about 0.5–4.75%, more preferably 0.5–4.0%, and even more preferably 1.5–2.5%. By using such amounts, the disbondment is significantly reduced. Further, use of these low levels of zinc borate compounds provides a significant decrease in cost, as it is commonly known that such zinc compounds are more expensive than thermosetting resin systems. Also, issues of zinc compound solubility, over long periods of time, are improved when low levels are used.

The zinc borate compound constituting the anticorrosive coating composition of the present invention, may comprise an individual zinc borate compound, or a mixture of two or more zinc borate compounds. Examples of such zinc borate compound include, but are not limited to, zinc methaborate [$Zn(BO_2)_2$], basic zinc borate [$ZnB_4O_7.2ZnO$] and zinc borate [$2ZnO.3B_2O_3.3.5H_2O$]. Zinc borate is preferably used. Zinc borate can be obtained by melting a mixed starting material of zinc oxide and boric acid or double-decomposing the aqueous solution of the mixed starting material. A particularly useful zinc borate compound is "Borogard ZB fine," [$2ZnO.3B_2O_3.3.5H_2O$], available from U.S. Borax, Incorporated.

The coating compositions of the present invention may additionally comprise one or more components taken, for example, from the group consisting of pigments, dyes, fillers, flow control agents, dispersants, thixotropic agents, adhesion promoters, antioxidants, light stabilizers and curing catalysts. They may also include other known anticorrosion agents, for example anticorrosion pigments, such as phosphate- or containing pigments, metal oxide pigments, for example calcium oxide or combined calcium oxide/silica pigments, or other organic or inorganic corrosion inhibitors, for example salts of nitroisophthalic acid, phosphoric esters, technical-grade amines or substituted benzotriazoles.

The pigments are, for example, titanium dioxide, iron oxide, aluminum bronze or phthalocyanine blue.

Examples of fillers are talc, alumina, aluminum silicate, barytes, mica, and silica. The corrosion inhibitors can be applied to a support material. Pulverulent fillers or pigments are particularly suitable for this purpose.

Flow control agents and thixotropic agents are based, for example, on modified bentonites or silicas.

Preferably the coating composition of the present invention contains from 0 to 55% by weight, more preferably 5 to 30% by weight, based upon total solids weight, of fillers, pigments, additives, or any mixtures thereof.

In a preferred embodiment, the curable coating composition is a powder coating composition prepared by conventional techniques employed in the powder coatings art. Typically, the components of the powder coating formulation are thoroughly blended together via medium to high intensity mixing and then melt blended in an extruder. Melt blending is generally carried out in the temperature range of between about 220° F. and 280° F. with careful control of the extruder temperature to minimize any curing and gelation from taking place in the extruder. The extruded composition, usually in sheet form after cooling, is broken into chips and then ground in a mill to a powder and subsequently screened to achieve the desired powder particle size.

The aforesaid curable powder coating composition of the present invention exhibits superior adhesive properties, as demonstrated by having superior resistance to cathodic disbondment, over an extended period, together with very rapid cure speeds. These properties provide a powder coating that can be readily applied, by typical application means in the powder coating art, to rebars, pipelines and other metallic substrates, some of which may require cold working after being coated. The superior adhesive properties of this invention provide the ability to adhere to even oily an scaly surfaces, such as those encountered on steel strappings and other marginally clean metallic substrates.

The cure time/temperature range of the aforementioned powder coating composition of this invention is found to be from about 60 seconds at about 470° F. to about 180 seconds at about 400° F.

In a typical powder coating procedure, the metal substrate is preheated to a temperature from about 400° F. to 490° F. Then, the powder coating is applied by standard means, such as fluidized bed immersion, electrostatic spray application, and the like. The residual heat in the preheated metal substrate provides enables the powder coating finish to melt, flow and begin to cure to a continuous, anticorrosive, dry film.

The aforesaid powder coated metal substrate may then be introduced into high temperature ovens, such as convection, infrared, or combination ovens, to melt, flow out and further cure into a smooth hardened film. In commercial high speed coating lines, the melt flow and cure time usually ranges between about 40 and 140 seconds at a peak substrate temperature ranging between about 400° F. and 490° F. Subsequently, the coated substrate is conveyed to a water quench to lower the temperature to between about 100° F. and 200° F.

Steel substrates are usually coated with an effective amount of powder coating to produce a dry film thickness of between about 5 and 20 mils thick or greater.

As mentioned above, the composition of the present invention is preferably directed to a particulate form powder coating composition. However, any coating used at a solid concentration from about 10 to 100% may be possible. In addition to the aforementioned powder coating, other coating types may include a solvent based type, a water based type, and the like.

The anticorrosive coating composition having the composition described above can be produced by the same method as the production methods of ordinary coating compositions. In the case of a liquid non-solvent coating composition, for example, a predetermined amount of the zinc borate compound is added to the thermosetting resin, and the mixture is subjected to dispersion treatment using a roll mill, a dissolver, etc. In the case of an organic solvent type coating composition, the mixture is subjected to dispersion treatment using a roll mill, a dissolver, an SG mill, a pot mill, etc. To prepare a powder coating composition, a predetermined amount of the zinc borate compound is added to the thermosetting resin, and the mixture is premixed, then heat-kneaded, cooled, and thereafter pulverized and classified.

The present invention likewise relates to a process for preparing a corrosion-resistant surface coating on a corrodable metal surface, which comprises treating this surface with the coating composition of the present invention.

The coating of the anticorrosive coating method according to the present invention is applied by the use of a brush, a roller, an airless spray, an air spray, a powder coating mechanism, etc., which is selected suitably in accordance with the form of the composition, in a customary manner. A heavy duty protective film such as polyethylene lining, heavy duty protective urethane coating composition, epoxy resin coating composition, and the like, and/or a finishing layer such as a coloring layer may be applied to the surface of the coating film after it is coated.

The present invention will now be further illustrated by a consideration of the following examples which are intended to be purely exemplary of the invention.

EXAMPLES

Test Procedure

The following cathodic disbondment test procedure was used for generating data reported in the examples below. Steel panels (4×4×⅝"), which were blasted and rinsed with phosphoric acid were coated with 14–18 mils of red fusion bond epoxy by pre-heating to 470° F. then dipping in a fluidized bed. After a post cure of 3 minutes, the panels were water quenched. The test panels were prepared for cathodic disbondment by drilling a 3 mm diameter hole in the center of each test panel, and sealing a 3.5 in diameter cylinder onto the panel. The cylinder was filled with 3% NaCl solution, a Platinum wire was immersed in the solution and the entire assembly was placed in an oven set at 80° C. A voltage of 1.5V was applied across the Platinum wire and the test panel. After 28 days in the oven, the panels were tested for disbondment by removing the solution and cylinder then making 8 radial cuts in the coating away from the holiday. The panel was left for one hour to cool to room temperature then the coating was removed with a knife by working away from the holiday edge using a levering action. The disbondment from the center of the holiday to edge of the disbonded area was measured, then averaged. This method follows TransCanada Pipeline spec. TESCOAT FBE Rev.0, which is based on CSA Z245.20-98.

Examples 1 to 5

Table 1 below illustrates the preparation of cathodic disbondment resistant thermosetting epoxy powder coating compositions, of the present invention, having zinc borate levels varied progressively from 4.9% down to 0%, that are suitable for fusion coating on rebars, pipelines, and other metallic substrates. For examples 1 to 5, the epoxy curing agent is an accelerated dicyandiamide type curing agent. All amounts are given in percent by weight of total formulation weight.

TABLE 1

| Ingredient | Ex. 1 | Ex. 2 | Ex. 3 | Ex. 4 | Ex. 5 |
| --- | --- | --- | --- | --- | --- |
| Epon ™ 2024 epoxy resin (Resolution Performance Products, LLC.) | 67.5 | 67.5 | 67.5 | 67.5 | 67.5 |
| Epicure ™ P104 curing agent (Resolution Performance Products, LLC.) | 1.7 | 1.7 | 1.7 | 1.7 | 1.7 |
| Zinc Borate (Borogard ™ ZB, US Borax, Inc.) | 0 | 0.5 | 1.5 | 3 | 4.9 |
| Nyad ™ M400 filler (NYCO Minerals, Inc.) | 29.5 | 29 | 28 | 26.5 | 24.6 |
| Bayferrox ™ 140 iron oxide pigment (Bayer Corp.) | 1 | 1 | 1 | 1 | 1 |
| Cabosil ™ M5 (Cabot, Inc.) | 0.3 | 0.3 | 0.3 | 0.3 | 0.3 |

The epoxy powder coating compositions listed in Table 1 were then coated on steel panels, cured, and subjected to long term performance tests, as described above. The cathodic disbondment test results are listed below in Table 2, and FIG. 1 further illustrates the cathodic disbondment resistance correlation with zinc borate concentration. As shown, significant disbondment resistance was observed at zinc borate levels at or below 4.9% by weight, based upon total formulation weight.

TABLE 2

| Cathodic Disbondment Test Results | | | | |
| --- | --- | --- | --- | --- |
| Example 1 | Example 2 | Example 3 | Example 4 | Example 5 |
| 32.9 mm | 26.3 mm | 20.8 mm | 18.6 mm | 15.8 mm |

Example 6

Table 3 below illustrates the preparation of a cathodic disbondment resistant thermosetting epoxy powder coating composition, of the present invention having zinc borate level of 3% and a phenolic type curing agent. All amounts are given in percent by weight of total formulation weight.

TABLE 3

| Ingredient | Example 6 |
| --- | --- |
| Epon ™ 2024 epoxy resin (Resolution Performance Products, LLC.) | 55 |
| Epikure ™ P202 phenolic epoxy curing agent (Resolution Performance Products, LLC.) | 11 |
| Zinc Borate (Borogard ™ ZB, US Borax, Inc.) | 3 |
| Nyad ™ M400 filler (NYCO Minerals, Inc.) | 29.7 |
| Bayferrox ™ 140 iron oxide pigment (Bayer Corp.) | 1 |
| Cabosil ™ M5 (Cabot, Inc.) | 0.3 |

The epoxy powder coating composition of Example 6, listed in Table 3, was then coated on steel panels, cured, and subjected to long term performance tests, as described above. The resultant coating yielded a 20.8 mm disbondment measurement, over the 28 day, 80° C., long term disbondment test.

Various modifications, alterations, additions or substitutions of this invention will be apparent to those skilled in the art without departing from the spirit and scope of this invention. This invention is not limited by the illustrative embodiments set forth herein, but rather is defined by the following claims.

I claim:

1. A curable coating composition that provides resistance to cathodic disbondment comprising:
   (a) a thermosetting resin, or mixture of thermosetting resins;
   (b) from about 0.5 to 4.75% by weight, based upon total solids weight, of a zinc borate compound; and
   (c) curing agent, or mixture of curing agents, capable of curing said coating composition in an amount effective to cure the coating, which further comprises a calcium oxide filler, silicate filler, or mixture thereof.

2. A curable coating composition of claim 1 which further comprises (i) a pigment selected from the group consisting of titanium dioxide, iron oxide, aluminum, bronze or phthalocyanine blue or (ii) an additive, or mixture of additives selected from the group consisting of dyes, flow control agents, dispersants, thixotropic agents, adhesion promoters, antioxidants, light stabilizers, curing catalysts, anticorrosion agent, and substituted benzotriazoles, or (iii) both (i) and (ii).

* * * * *